US011086872B2

(12) United States Patent
Chen (10) Patent No.: US 11,086,872 B2
(45) Date of Patent: *Aug. 10, 2021

(54) METHOD AND SYSTEM FOR OUTER JOIN OF DATABASE TABLES

(71) Applicant: Ant Financial (Hang Zhou) Network Technology Co., Ltd., Hangzhou (CN)

(72) Inventor: Mengmeng Chen, Hangzhou (CN)

(73) Assignee: Ant Financial (Hang Zhou) Network Technology Co., Ltd., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/100,574

(22) Filed: Nov. 20, 2020

(65) Prior Publication Data

US 2021/0073231 A1    Mar. 11, 2021

Related U.S. Application Data

(63) Continuation of application No. 16/877,394, filed on May 18, 2020, now Pat. No. 10,885,035, which is a
(Continued)

(30) Foreign Application Priority Data

Apr. 26, 2019 (CN) .......................... 201910345389.6

(51) Int. Cl.
*G06F 17/00* (2019.01)
*G06F 7/00* (2006.01)
(Continued)

(52) U.S. Cl.
CPC .... *G06F 16/24544* (2019.01); *G06F 16/2282* (2019.01); *G06F 16/2456* (2019.01); *G06F 16/24537* (2019.01); *G06F 16/24556* (2019.01)

(58) Field of Classification Search
CPC ......... G06F 16/24544; G06F 16/24537; G06F 16/24556; G06F 16/2282; G06F 16/2456
(Continued)

(56) References Cited

U.S. PATENT DOCUMENTS 6,421,663 B1 * 7/2002 Chen ................. G06F 16/24544
707/999.002
6,618,719 B1 * 9/2003 Andrei ............. G06F 16/24547
707/999.003
(Continued)

FOREIGN PATENT DOCUMENTS

CN          102844754 A    12/2012
CN          106933927 A     7/2017
(Continued)

OTHER PUBLICATIONS

Written Opinion and International Search Report for PCT Application No. PCT/CN2020/071400 made available to public on Oct. 29, 2020.
(Continued)

*Primary Examiner* — Pavan Mamillapalli (57) ABSTRACT

The specification provides a system, method, and storage medium for executing an outer join command on a first table and a second table in a distributed database. The method may comprise: broadcasting the first data set to a plurality of database nodes storing the second data set; dividing the plurality of database nodes into a first subset and a second subset; obtaining, an OUTER JOIN result based on the first data set broadcasted to each database node of the first subset and the portion of the second data set stored therein; obtaining, an INNER JOIN result based on the first data set broadcasted to each database node of the second subset and the portion of the second data set stored therein; and
(Continued)

returning a result to the OUTER JOIN command by aggregating the OUTER JOIN result and the INNER JOIN result.

20 Claims, 5 Drawing Sheets

Related U.S. Application Data continuation of application No. PCT/CN2020/071400, filed on Jan. 10, 2020.

(51) Int. Cl.
G06F 16/2453 (2019.01)
G06F 16/2455 (2019.01)
G06F 16/22 (2019.01)

(58) Field of Classification Search
USPC .......................................................... 707/714
See application file for complete search history.

(56) References Cited

U.S. PATENT DOCUMENTS

| | | | |
|---|---|---|---|
| 6,850,927 B1* | 2/2005 | Hsu | G06F 16/24542 |
| | | | 707/999.006 |
| 6,957,214 B2 | 10/2005 | Silberberg et al. | |
| 7,249,118 B2 | 7/2007 | Sandler et al. | |
| 7,546,311 B2 | 6/2009 | Nica | |
| 7,730,055 B2 | 6/2010 | Bellamkonda et al. | |
| 8,190,610 B2 | 5/2012 | Dasdan et al. | |
| 8,386,471 B2 | 2/2013 | Collins et al. | |
| 8,554,761 B1* | 10/2013 | Ahmed | G06F 16/24537 |
| | | | 707/714 |
| 8,600,994 B1 | 12/2013 | Xu et al. | |
| 8,688,722 B1* | 4/2014 | Kostamaa | G06F 16/2456 |
| | | | 707/756 |
| 8,751,460 B1 | 6/2014 | Annapragada et al. | |
| 9,009,140 B2 | 4/2015 | Chen et al. | |
| 9,311,359 B2 | 4/2016 | Attaluri et al. | |
| 9,430,550 B2 | 8/2016 | Ziauddin et al. | |
| 10,133,778 B2 | 11/2018 | Lee et al. | |
| 10,885,035 B2 | 1/2021 | Chen | |
| 2003/0120682 A1* | 6/2003 | Bestgen | G06F 16/24526 |
| | | | 707/999.104 |
| 2003/0187831 A1* | 10/2003 | Bestgen | G06F 16/24542 |
| | | | 707/999.003 |
| 2005/0065927 A1 | 3/2005 | Nouri et al. | |
| 2005/0086208 A1* | 4/2005 | Bestgen | G06F 16/24544 |
| | | | 707/999.003 |
| 2007/0130115 A1* | 6/2007 | Au | G06F 16/24535 |
| | | | 707/999.002 |
| 2011/0055199 A1 | 3/2011 | Siddiqui et al. | |
| 2011/0302151 A1 | 12/2011 | Abadi et al. | |
| 2012/0047117 A1 | 2/2012 | Nica | |
| 2012/0117056 A1 | 5/2012 | Al-omari et al. | |
| 2013/0166535 A1 | 6/2013 | Valentin | |
| 2014/0012882 A1* | 1/2014 | Poppitz | G06F 16/24561 |
| | | | 707/792 |
| 2014/0101130 A1* | 4/2014 | Kang | G06F 16/24544 |
| | | | 707/714 |
| 2014/0156635 A1* | 6/2014 | Grochowski | G06F 16/24544 |
| | | | 707/714 |
| 2015/0142775 A1* | 5/2015 | Kang | G06F 16/24544 |
| | | | 707/714 |
| 2017/0031989 A1* | 2/2017 | Barbas | G06F 16/24537 |
| 2017/0147644 A1 | 5/2017 | Lee et al. | |
| 2018/0113909 A1* | 4/2018 | Ramesh | G06F 11/1435 |
| 2018/0276277 A1* | 9/2018 | Wang | G06F 16/24545 |

FOREIGN PATENT DOCUMENTS

| | | |
|---|---|---|
| CN | 109241101 A | 1/2019 |
| CN | 109344169 A | 2/2019 |
| CN | 110175202 A | 8/2019 |

OTHER PUBLICATIONS

Yu, Yang et al., "An Outer Join Algorithm Based on Cuckoo Filter", Journal of East China Normal University (Natural Science), Sep. 2017.

Chen, Yin, "Study on Uses fro Joining Multiple Tables in a Relational Database," Computer Programming Skills & Maintenance, Aug. 31, 2015.

First Search for Chinese Application No. 201910345389.6 dated May 23, 2021.

Yu et al., "An outer join algorithm based on Cuckoo filter," Journal of East China Normal University (Natural Science), No. 5, Sep. 30, 2017.

Fan, "Distributed Joins and Optimization for Big Table Based on Database Oceanbase," East China Normal University, Apr. 2016.

* cited by examiner

METHOD AND SYSTEM FOR OUTER JOIN OF DATABASE TABLES

CROSS REFERENCE TO RELATED APPLICATIONS

The present application is a continuation application of U.S. patent application Ser. No. 16/877,394, filed on May 18, 2020, which is a continuation application of International Patent Application No. PCT/CN2020/071400, filed on Jan. 10, 2020. The International Patent Application No. PCT/CN2020/071400 claims priority to Chinese Patent Application No. 201910345389.6, filed on Apr. 26, 2019. The entire content of the above referenced applications are incorporated herein by reference.

TECHNICAL FIELD

Embodiments disclosed in the specification relate to the field of database technology, and in particular, to a method and system for outer joining tables in a database.

BACKGROUND

A join operation is a common logical operation for databases and is also one of the most time-consuming operations. The execution efficiency of the join operation often has a decisive influence on the time taken to execute an entire request. In a distributed database, an optimizer needs to take into account statistical information of the data, join sequence, access path and other factors; further, the optimizer needs to generate an execution planning with the lowest execution cost in a distributed environment according to physical distribution information of the data.

An "outer join" operation is a type of "join" operation. For the outer join operation, due to the semantic requirements (returning unmatched rows in an outer table in addition to returning matched rows), an execution planning of broadcasting the outer table may not be used directly; and in some scenarios, a large amount of data may be redistributed, which reduces the execution efficiency.

Therefore, it is desirable to have a solution that can ensure the accurate execution of the outer join and improves the execution efficiency of the outer join at the same time.

SUMMARY

In order to improve the execution efficiency with the accuracy of an outer join result ensured, the specification provides an outer join method and system for databases.

The specification achieves the above-described objects through the following technical solutions.

In one aspect of the present invention, a method for outer joining a first table to a second table of a database is disclosed, comprising: broadcasting the first data set to a plurality of database nodes of the distributed database storing the second data set, wherein each of the plurality of database nodes stores a portion of the second data set; dividing the plurality of database nodes storing the second data set into a first subset and a second subset, wherein the first subset comprises at least one but less than all of the plurality of database nodes, the at least one database node storing a least amount of data of the second data set; obtaining, an OUTER JOIN result by executing an OUTER JOIN operation based on the first data set broadcasted to each database node of the first subset and the portion of the second data set stored in the each database node of the first subset; obtaining, an INNER JOIN result by executing an INNER JOIN operation based on the first data set broadcasted to each database node of the second subset and the portion of the second data set stored in the each database node of the second subset; and returning a result to the OUTER JOIN command by aggregating the OUTER JOIN result from each database node of the first subset and the INNER JOIN result from each database node of the second subset.

In some embodiments, the method further comprises: identifying and removing a first row with a NULL value from the OUTER JOIN result when the INNER JOIN result comprises a second row sharing a same join key with the first row.

In some embodiments, the first data set is a distributed database data set stored in a plurality of second database nodes, and the broadcasting the first data set to a plurality of database nodes storing the second data set comprises: broadcasting data from each database node of the plurality of second database nodes to each database node of the plurality of database nodes.

In some embodiments, the executing the OUTER JOIN operation based on the first data set broadcasted to the each database node of the first subset and the portion of the second data set stored in the each database node of the first subset comprises: performing the OUTER JOIN operation by using the first data set broadcasted to the each database node of the first subset as an outer data set and the portion of the second data set stored on the each database node of the first subset as an inner data set.

In some embodiments, the OUTER JOIN operation executed by each of database nodes of the first subset is based on one or more join keys of the OUTER JOIN command; and the INNER JOIN operation executed by each of database nodes of the second subset is based on the one or more join keys of the OUTER JOIN command.

In some embodiments, each of the first data set and the second data set comprises at least one of the following: a database table, or an intermediate result of a database operation.

In another aspect of the present invention, a system for executing an outer join command on a first table and a second table in a distributed database is disclosed. The system may comprise a processor and a non-transitory computer-readable storage medium storing instructions executable by the processor to cause the system to perform operations comprising: broadcasting the first data set to a plurality of database nodes of the distributed database storing the second data set, wherein each of the plurality of database nodes stores a portion of the second data set; dividing the plurality of database nodes storing the second data set into a first subset and a second subset, wherein the first subset comprises at least one but less than all of the plurality of database nodes, the at least one database node storing a least amount of data of the second data set; obtaining, an OUTER JOIN result by executing an OUTER JOIN operation based on the first data set broadcasted to each database node of the first subset and the portion of the second data set stored in the each database node of the first subset; obtaining, an INNER JOIN result by executing an INNER JOIN operation based on the first data set broadcasted to each database node of the second subset and the portion of the second data set stored in the each database node of the second subset; and returning a result to the OUTER JOIN command by aggregating the OUTER JOIN result from each database node of the first subset and the INNER JOIN result from each database node of the second subset.

In still another aspect of the present invention, a non-transitory computer-readable storage medium for executing an outer join command on a first table and a second table in a distributed database is disclosed. The storage medium may be configured with instructions executable by one or more processors to cause the one or more processors to perform operations comprising: broadcasting the first data set to a plurality of database nodes of the distributed database storing the second data set, wherein each of the plurality of database nodes stores a portion of the second data set; dividing the plurality of database nodes storing the second data set into a first subset and a second subset, wherein the first subset comprises at least one but less than all of the plurality of database nodes, the at least one database node storing a least amount of data of the second data set; obtaining, an OUTER JOIN result by executing an OUTER JOIN operation based on the first data set broadcasted to each database node of the first subset and the portion of the second data set stored in the each database node of the first subset; obtaining, an INNER JOIN result by executing an INNER JOIN operation based on the first data set broadcasted to each database node of the second subset and the portion of the second data set stored in the each database node of the second subset; and returning a result to the OUTER JOIN command by aggregating the OUTER JOIN result from each database node of the first subset and the INNER JOIN result from each database node of the second subset.

The embodiments disclosed in the specification have at least the following beneficial effects:

1. In some embodiments, the execution ensures that a left table can be sent, by broadcasting, to each node where a right table is located in a distributed outer join planning by mixing inner join and outer join operators and deduplicating the final results. Compared with a traditional planning, when data in the right table is widely distributed and the amount thereof is large, the disclosed embodiments can greatly reduce the amount of the data transmitted via a network, thereby improving the execution efficiency.

2. In some embodiments, only one outer join node is kept to ensure the minimum generation of the to-be-deleted redundant data, which in turn further reduces the amount of the transmitted and computed data.

3. By processing different scenarios in a "GROUP BY" operation, it is ensured that accurate execution results can be returned for three scenarios, namely with matched rows, without matched rows, and without matched rows on the outer join node respectively.

4. In some embodiments, there is no need to make any substantial changes to an existing database system.

Apparently, products implementing the embodiments disclosed in the specification may not need to achieve all the above technical effects at the same time.

BRIEF DESCRIPTION OF THE DRAWINGS

The above summary and the following detailed description of the specification will be better understood when read in conjunction with the accompanying drawings. It should be noted that the accompanying drawings are merely examples of the claimed invention. In the accompanying drawings, the same reference numerals represent the same or similar elements.

DETAILED DESCRIPTION

The detailed features and advantages of the embodiments disclosed in the specification will be described in detail in the following detailed description, the content of which is sufficient for any one of ordinary skill in the art to understand the technical content of the disclosed embodiments and implement the solutions accordingly; and those skilled in the art can easily understand the related objects and advantages of the disclosed embodiments according to the description, claims, and drawings disclosed in the description.

Hereinafter, some terms used in this specification will be first introduced; execution manners of some distributed outer joins will be described with reference to FIGS. 1 and 2; an execution manner of a distributed outer join according to an embodiment of the specification will be described with reference to FIG. 3; and finally a method for outer joining a first table to a second table of a database according to an embodiment of the specification will be described with reference to FIG. 4.

The so-called database herein generally refers to a row-oriented database, which does not depend on a storage engine structure, a network interconnection mode, or a cost model of an optimizer, or the like thereof. The database may comprise various common databases, including, but not limited to, OceanBase, MySQL, Oracle, DB2, or the like.

The term "database data set" is used to refer to database tables, intermediate result of database operations, or another suitable forms of data within the realm of database technology. For simplicity, the term "database table" is used in this specification as an example of a "database data set," and embodiments applicable to "database tables" are also applicable to other forms of "database data set."

A join operation of a database refers to an operation of associating related data in the database together under certain conditions.

An outer join operation is one type of join operations, which generally relates to an outer table and an inner table. In the outer join operation, in addition to having the matched rows of the two tables returned, rows in the outer table that do not find a match in the inner table are also returned. Common outer join manners include a left outer join and a right outer join. In the left outer join, a left table is taken as an outer table and a right table an inner table; and in the right outer join, the right table is taken as an outer table and the left table an inner table. Hereinafter, unless otherwise stated, "outer joining a first database to a second database" generally refers to performing an outer join by using a first database as the outer table and a second database as the inner table.

Databases comprise a centralized database and a distributed database. In join operations for the distributed database, a data redistribution operation is generally required. Data redistribution generally refers to a process of redistributing, through a network, data located at different physical nodes according to certain rules, which may include broadcasting, randomization, hashing, etc. In this specification, a node may refer to a device or system with data storage capacity and computing power, such as an X86 PC, or a database system that stores and computers separately.

An optimizer may also be used in database operations. The optimizer generally refers to a module that generates an execution planning in the database. Generally speaking, the most advanced database often employs an optimizer based on the execution cost to generate an optimal execution plan.

The above-described terms are only to help understand the specification and are not intended to limit the scope of the specification in any way.

Figure 1:
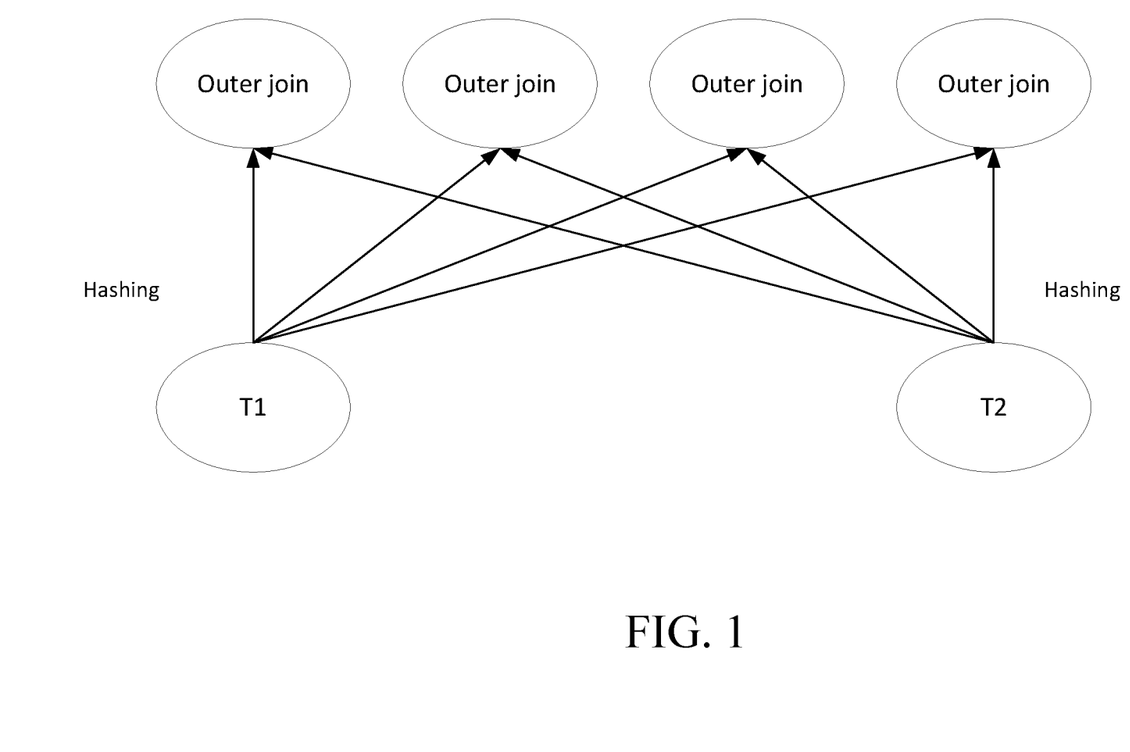
FIG. 1 shows a schematic diagram of an execution manner of a distributed outer join.

Referring to FIG. 1, a schematic diagram of an execution manner of a distributed outer join is illustrated. Two tables T1 and T2 are shown in FIG. 1.

For the convenience of description, it is assumed that table T1 is as shown in Table 1 below:

TABLE 1

| table T1 | |
| --- | --- |
| Age | Subsidy |
| 22 | 1,000 |
| 23 | 1,500 |
| 24 | 2,000 |

It is assumed that table T2 is as shown in Table 2 below:

TABLE 2

| table T2 | |
| --- | --- |
| Age | Subsidy |
| 22 | Zhang San |
| 22 | Li Si |
| 23 | Wang Wu |
| 25 | Zhao Liu |
| 27 | Sun Qi |
| 27 | Qian Ba |

It is assumed that an outer join operation is to be performed on the tables, for example, select * from T1 left outer join T2 on T1. Age.

As shown in FIG. 1, in this join manner, the data of the outer table T1 and the inner table T2 are redistributed into multiple join operators based on a hash value of a join key. In this way, it is ensured that rows with the same value certainly appear in an input of the same join operator.

For example, the operation may be performed as follows. Firstly, select a column such as "age" in the table, and then generate hash values for different ages at each row in the data table by using a predefined hash function (generally the result is an unsigned integer); next, perform a modulo operation according to a predefined grouping number, and sent data in the row to a corresponding partition; for example, for age 22, the generated hash value is 37, and the modulo operation is performed according to the grouping number 4 (the result is 1); then the data in the row will be sent to a group numbered 1. Grouping is a logical concept, and the data of the same group will be sent to the same worker for execution.

In examples of the tables T1 and T2, it is assumed that the ages are grouped into three groups: [22], [23, 25], and [27], such that all data with the age 22 will be sent to a first worker for execution; all data with the age 27 will be sent to a second worker for execution; and all data with the ages 23 and 25 will be sent to a third worker for execution. The first, second, and third workers can respectively perform corresponding join operations.

The above-described redistribution and join manners may be performed in any way known to those skilled in the art but are not limited thereto.

However, this manner requires a large amount of data redistribution; the amount of data required to be transmitted is very large, and a lot of operations also need to be performed.

Figure 2:
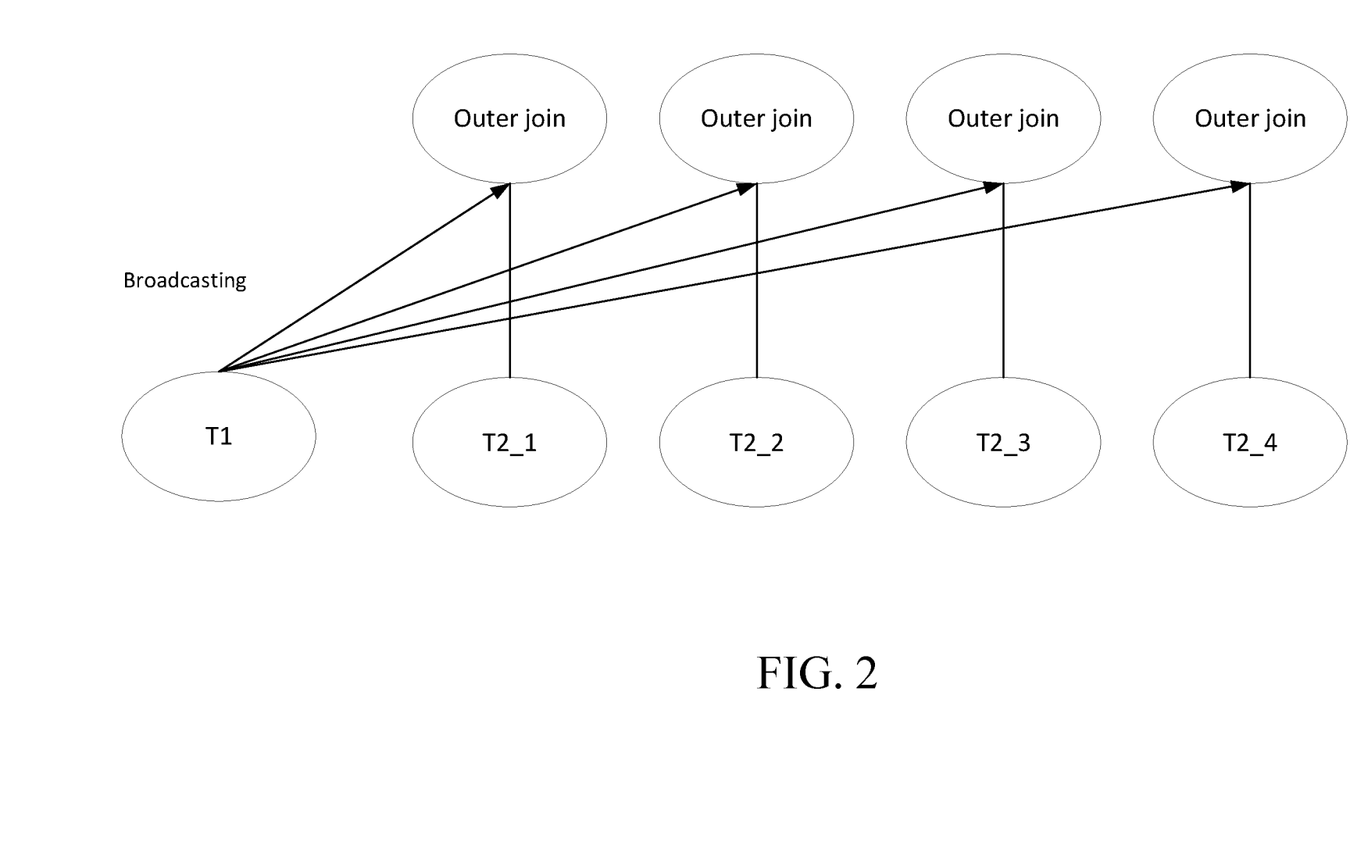
FIG. 2 shows a schematic diagram of another execution manner of a distributed outer join.

In order to simplify the operations, an alternative distributed outer join execution manner is as shown in FIG. 2. In the example of FIG. 2, an outer table is broadcast to each node of an inner table. An outer join operation is performed on each node.

However, this outer join execution manner has its own problem. According to the semantics of an outer join, if a row in the outer table does not have a matched row in the inner table, the row needs to be returned and a related column in the projected inner table is set to NULL. Therefore, this outer join way may lead to a result with errors.

In some embodiments, a table in a distributed database may be stored in a plurality of nodes, with each of the plurality of nodes storing a portion of the table. Taking the table T2 above as an example, its nodes are shown in the following tables 3-6:

TABLE 3

| table T2_1 | |
| --- | --- |
| Age | Subsidy |
| 22 | Zhang San |
| 22 | Li Si |

TABLE 4

| table T2_2 | |
| --- | --- |
| Age | Subsidy |
| 23 | Wang Wu |

TABLE 5

| table T2_3 | |
| --- | --- |
| Age | Subsidy |
| 25 | Zhao Liu |

TABLE 6

| table T2_4 | |
| --- | --- |
| Age | Subsidy |
| 27 | Sun Qi |
| 27 | Qian Ba |

If the above-described outer join execution manner is adopted, for the row (22, 1,000) in table T1, two rows (22, 1000, "Zhang San") and (22, 1000, "Li Si") will be returned by outer joining with table T2_1; and no matched rows can be found in tables T2_2/T2_3/T2_4. At this time, according to the semantics of the outer join, a row (22, 1,000, NULL) will be returned for the tables T2_2/T2_3/T2_4 respectively. However, NULL should not be returned when a matched row of the outer join exists in the outer table. Therefore, applying the above-described outer join execution manner may yield redundant rows including NULL, and thus generate a wrong result. In addition, this manner also generates a large number of tables including NULL, thus leading to a large amount of redundant data.

For example, for the row (22, 1000), a result returned by the distributed planning is as follows:
  (22, 1000, "Zhang San") (from T2_1)
  (22, 1000, "Li Xi") (from T2_1)
  (22, 1000, NULL) (from T2_2)
  (22, 1000, NULL) (from T2_3)
  (22, 1000, NULL) (from T2_4)

But according to the semantics of the outer join, the correct result should be as follows:
  (22, 1000, "Zhang San") (from T2_1)
  (22, 1000, "Li Xi") (from T2_1)

Figure 3:
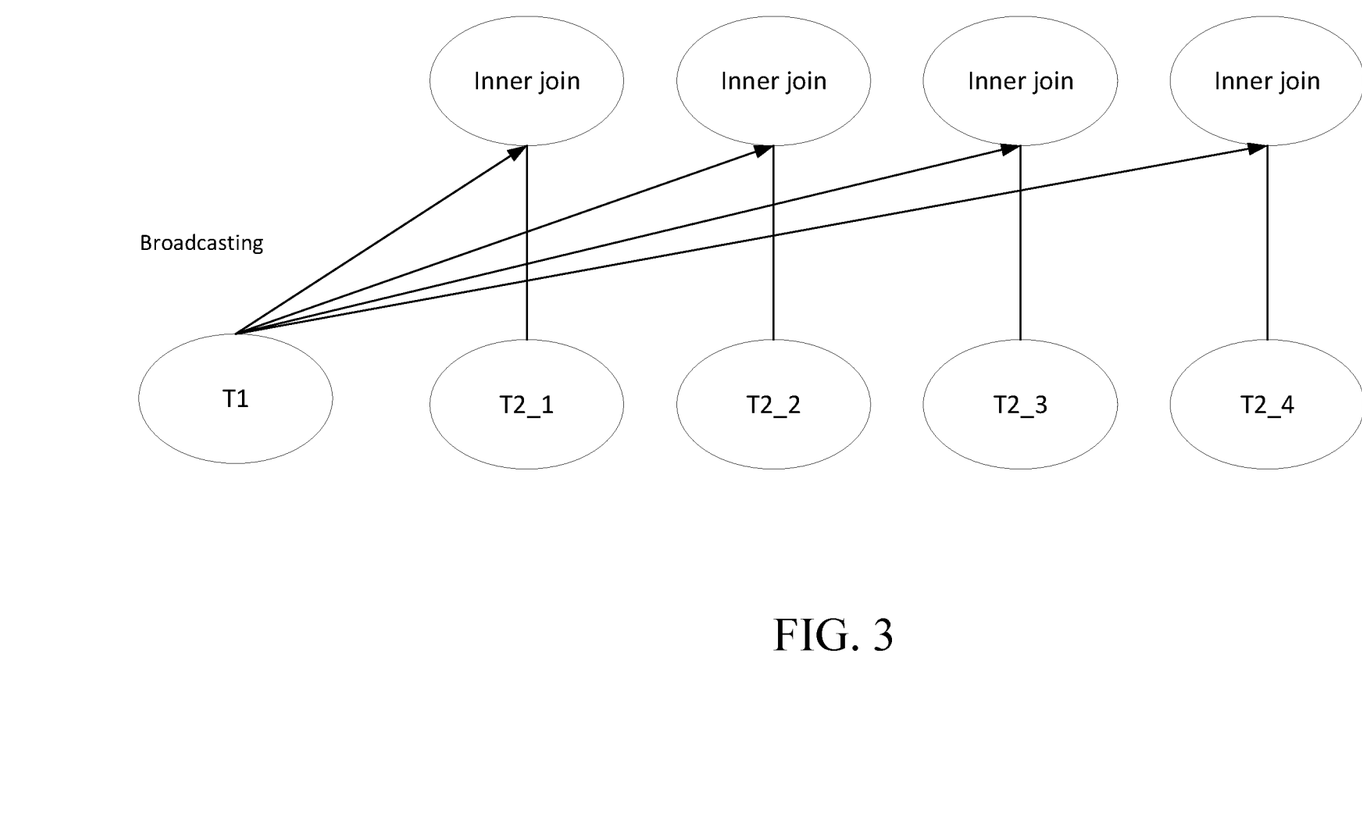
FIG. 3 shows a schematic diagram of still another execution manner of a distributed outer join.

Another alternative distributed outer join execution manner is shown in FIG. 3. The manner in FIG. 3 is similar to that of FIG. 2, except that at each node, an inner join operation is performed instead of an outer join operation. There are also problems with this execution manner. Here the same examples above are used for illustration: since no matched row can be found in each node of table T2 for the row (24, 2000) in table T1, the corresponding inner join will return a null, resulting in a final execution result missing the corresponding data for this row.

Figure 4:
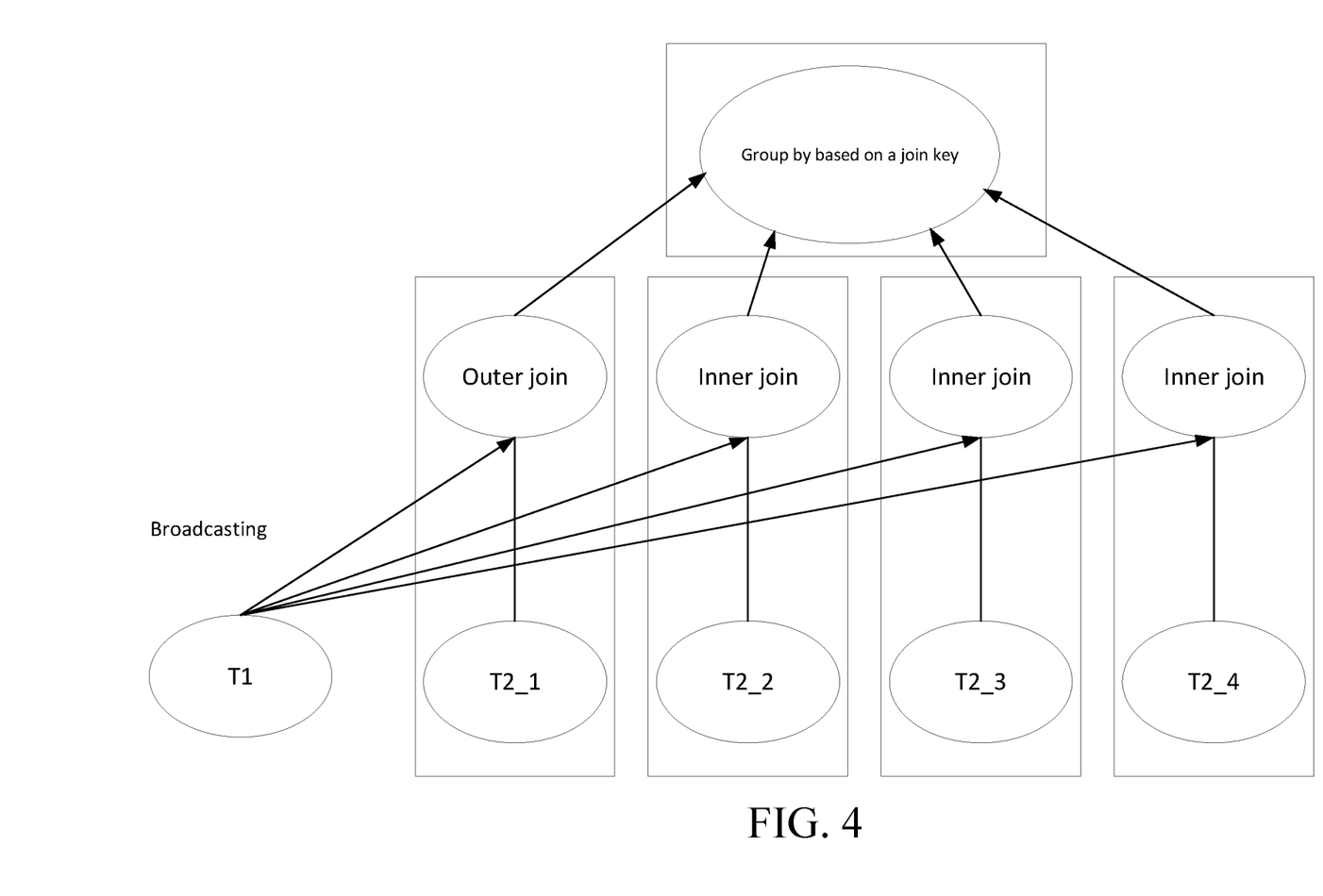
FIG. 4 shows a schematic diagram of an execution manner of a distributed outer join according to an embodiment of the present invention.

Referring to FIG. 4, a schematic diagram of an execution manner of a distributed outer join according to an embodiment of the specification is shown.

In one embodiment, the outer table T1 is broadcasted to each node of the inner table T2. The adopted broadcasting manner may avoid redistribution of a large amount of data in the example of FIG. 1, and thus has advantages compared with the execution manner illustrated in FIG. 1.

In some embodiments, unlike the manner of completely using an outer join or an inner join shown in FIG. 2 and FIG. 3, respectively, an outer table is outer joined to one or more nodes of an inner table; and the outer table is inner joined to the other nodes of the inner table. By reducing the number of nodes on which the outer join operation is performed, this embodiment may greatly reduce the number of rows including NULL, thereby reducing the amount of redundant data; as a result, this execution manner also has advantages when compared with the execution manner illustrated in FIG. 2. In addition, since the outer join is performed on at least one node, there will be no missing data; as a result, this execution manner also has advantages when compared with the execution manner illustrated in FIG. 3.

In some embodiments, the outer join operation is performed on only one node of the inner table, and the inner join operation is performed on all the other nodes. Alternatively, the outer join operation is performed on one or a plurality of nodes rather than merely on one node; and the inner join operation is performed on the other nodes. For example, the outer join operation may be performed on proper subsets of all nodes of the inner table. Alternatively, the outer join operation may be performed on all nodes of the inner table. The number of nodes on which the outer join operation is performed will affect the amount of redundant data.

In some embodiments, selecting nodes on which the outer join is performed may be random. In some embodiments, the node on which the outer join is performed may be selected based on a specific criterion. For example, the inner table may be distributed among multiple nodes in an uneven manner, with some nodes storing larger portions of the inner table and others storing smaller portions of the inner table. In such scenarios, the node(s) may first be sorted based on the amount of data in the inner table they stored, and the nodes with the least (smallest) amount of data in the inner table (or the top n nodes with least amount of data) may be selected as the node(s) on which the outer join is performed. One or a plurality of nodes on which the outer join is performed may also be selected based on other factors such as data distribution on a network. For example, one node with the fastest connection (or the top n nodes with the fastest connection) may be selected as the nodes on which the outer join is performed.

In some embodiments, the selected nodes performing the outer join operation may generate an outer join result, the other nodes performing the inner join operation may generate an inner join. When the outer join result includes a row with a join key value and a NULL value, and the inner join result also includes another row with the same join key value, the row from the outer join result may be removed. In some embodiments, the removal may be accomplished by performing a "GROUP BY" operation based on a join key of the outer join. The "GROUP BY" operation may be performed by an aggregation node at an upper layer. By grouping according to a key value of the outer join, rows with NULL generated by errors would be deleted from relevant groups, thereby ensuring the accuracy of results and reducing the amount of redundant data.

Specific details will be provided by using the examples in Tables 1-6 above as examples. It is assumed that a node T2_1 in the inner table T2 is selected and subjected to an outer join operation, and an inner join operation is performed on the other nodes in the inner table T2.

For the row (22, 1000) in the outer table T1, two rows, namely (22, 1000, "Zhang San") and (22, 1000, "Li Xi"), will be returned when the outer join operation is performed since a matched row can be found on the node T2_1. When the inner join operation is performed on the other nodes, no result will be returned due to the absence of a matched row. Moreover, since there is no row including NULL, the processing of the aggregation node will not change the data.

For the row (23, 1500) in the outer table T1, the row (23, 1500, NULL) will be returned when the outer join operation is performed on the node T2_1; and the row (23, 1500, "Wang Wu") will be returned when the inner join operation is performed on the node T2_2; and no results will be returned when performed on the other nodes. When a GROUP BY operation is performed on the aggregation node, the row (23, 1500, NULL) will be removed and the row (23, 1500, "Wang Wu") will be kept, thus generating an accurate result.

For the row (24, 2000) in the outer table T1, the row (24, 2000, NULL) will be returned when the outer join operation is performed on the node T2_1, and no results will be returned when performed on all the other nodes. When the GROUP BY operation is performed on the aggregation node, the row (24, 2000, NULL) will be kept, thus generating an accurate result.

It can be appreciated that although the outer table T1 is described as a non-distributed table in the above examples, the outer table T1 may also be a distributed table including a plurality of nodes. In that case, each node of the outer table T1 will be broadcast to each node of the inner table T2.

Figure 5:
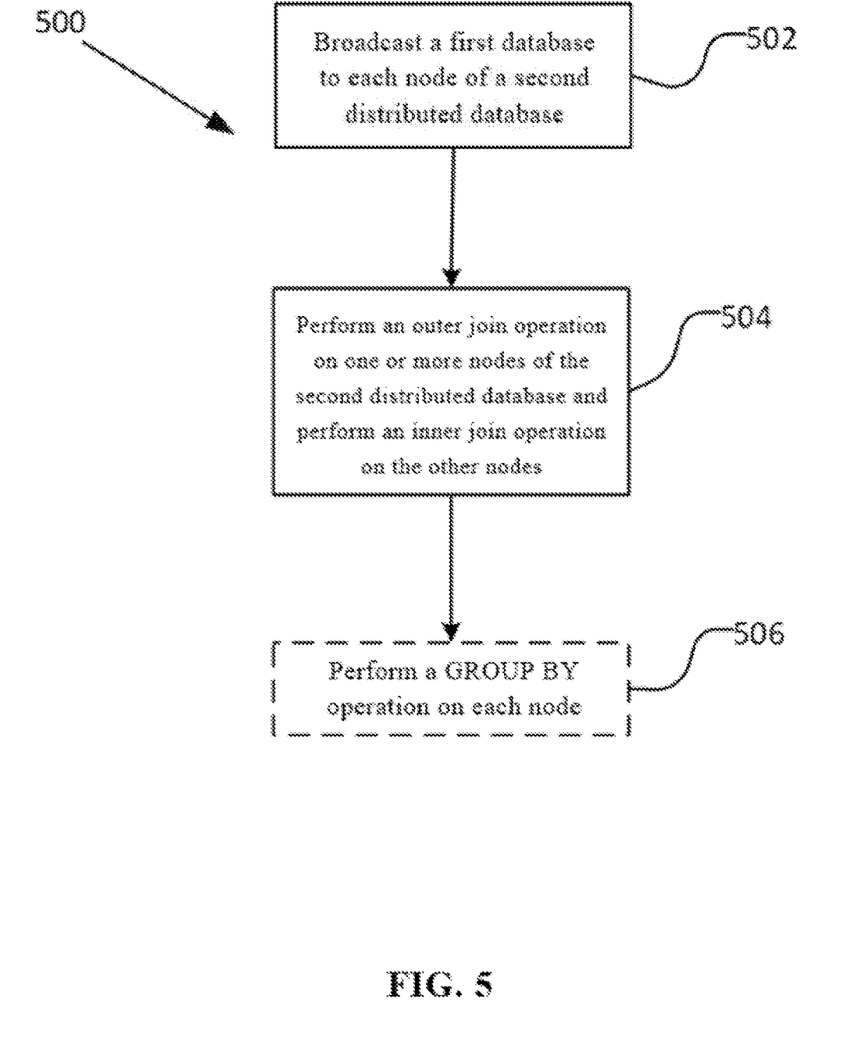
FIG. 5 shows a flowchart of a method for outer joining a first table to a second table according to an embodiment of the present invention.

Referring to FIG. 5 below, a flowchart of a method 500 for outer joining a first table to a second table according to an embodiment of the specification is shown.

The method 500 may comprise: in block 502, broadcasting a first table (e.g., the outer table T1) to each node (e.g., nodes T2_1, T2_2, T2_3, and T2_4) of a second table (e.g., the inner table T2).

The method 500 may further comprise: in block 504, performing an outer join operation on one or a plurality of nodes of the second table and performing an inner join operation on the other nodes of the second table. For example, the outer table T1 is outer joined to the inner table T2_1, and the outer table T1 is inner joined to each of T2_1, T2_2, T2_3, and T2_4.

In some embodiments, the step of performing an outer join operation on one or a plurality of nodes of the second table refers to performing the outer join operation on proper subsets of all nodes of the second table. In some embodiments, the step of performing an outer join operation on one or a plurality of nodes of the second table refers to performing the outer join operation on only one node of the second table.

In some embodiments, the step of broadcasting the first table to each node of the second table comprises broadcasting each node of the first table to each node of the second table.

The method 500 may further comprise: in an optional block 506, performing a "GROUP BY" operation based on a join key of the outer join on each node of the second table. For example, the GROUP BY operation based on the join key (e.g., t1. age) is performed on the outer joined nodes T2_1, T2_2, T2_3, and T2_4.

Moreover, the invention further discloses a system for storing data, comprising a first table and a second table. The system may be configured to perform the methods described above.

In some embodiments, the system may further comprise an aggregation node on which the above-described GROUP BY operation can be performed.

Moreover, the present specification further discloses a computer-readable storage medium having stored therein a computer-executable instruction which, when executed by a processor, enables the processor to perform the methods of the embodiments described herein.

Moreover, the present specification also discloses a computer system, comprising an apparatus for performing the methods of the embodiments described herein.

The methods according to various embodiments of the specification may be implemented in software, firmware, or a combination thereof.

It should be understood that a specific order or hierarchy of steps in the disclosed method is illustrative of an exemplary process. Based on design preferences, it should be understood that the specific order or hierarchy of steps in these methods can be rearranged. The attached method claims present elements of various steps in a sample order; the elements, however, are not to be limited to the specific order or hierarchy presented, unless specifically stated herein.

It should be understood that elements described herein in a singular form or only shown as one in the drawings do not mean that the number of such elements is limited to one. In addition, modules or elements described or shown to be separate herein may be combined into a single module or element, and a module or element described or shown to be single herein may be divided into multiple modules or elements.

It should also be understood that the terms and expressions used herein are for description only, and the specification should not be limited thereto. The use of these terms and expressions does not mean that any equivalent feature of illustration and description (or portions thereof) are excluded, and it should be recognized that various modifications that may exist should also fall within the scope of the claims. Other modifications, changes, and replacements are also possible. Accordingly, the claims are deemed to cover all such equivalents.

Similarly, it should be noted that although the specification has been described with reference to the current specific embodiments, those of ordinary skill in the art should understand that the embodiments mentioned above are merely used to illustrate the present invention; and various equivalent changes or replacements can be made without departing from the spirit of the present invention; therefore, any changes or modifications made to the above embodiments that are within the scope of the essential spirit of the specification will fall within the scope of the claims of the present specification.

The specification relates to a method for outer joining a first table to a second table of a database. The method comprises broadcasting the first table to each node of the second table and performing an outer join operation on one or a plurality of nodes of the second table and performing an inner join operation on other nodes of the second table. A related system and storage medium are also provided. The solution of the specification enhances the execution efficiency while ensuring the execution accuracy.

The invention claimed is:

1. A computer-implemented method comprising:
broadcasting a first data set to a plurality of database nodes storing a second data set, wherein each of the plurality of database nodes stores a portion of the second data set;
dividing the plurality of database nodes storing the second data set into a first subset and a second subset, wherein the first subset comprises at least one but less than all of the plurality of database nodes, the at least one database node storing a least amount of data of the second data set;
obtaining an OUTER JOIN result by executing an OUTER JOIN operation based on the first data set broadcasted to each database node of the first subset and the portion of the second data set stored in the each database node of the first subset;
obtaining an INNER JOIN result by executing an INNER JOIN operation based on the first data set broadcasted to each database node of the second subset and the portion of the second data set stored in the each database node of the second subset; and
returning a result to an OUTER JOIN command by aggregating the OUTER JOIN result from each database node of the first subset and the INTER JOIN result from each database node of the second subset.

2. The method of claim 1, further comprising:
identifying and removing a first row with a NULL value from the OUTER JOIN result when the INNER JOIN result comprises a second row sharing a same join key with the first row.

3. The method of claim 2, wherein the identifying and removing a first row with a NULL value comprises:
performing a GROUP BY operation to the OUTER JOIN result and the INNER JOIN result based on one or more join keys of the OUTER JOIN command.

4. The method of claim 1, wherein the first data set is a distributed database data set stored in a plurality of second database nodes, and the broadcasting the first data set to a plurality of database nodes storing the second data set comprises:
broadcasting data from each database node of the plurality of second database nodes to each database node of the plurality of database nodes.

5. The method of claim 1, wherein the executing the OUTER JOIN operation based on the first data set broadcasted to the each database node of the first subset and the portion of the second data set stored in the each database node of the first subset comprises:
performing the OUTER JOIN operation by using the first data set broadcasted to the each database node of the first subset as an outer data set and the portion of the second data set stored on the each database node of the first subset as an inner data set.

6. The method of claim 1, wherein the OUTER JOIN operation executed by each of database nodes of the first subset is based on one or more join keys of the OUTER JOIN command; and
the INNER JOIN operation executed by each of database nodes of the second subset is based on the one or more join keys of the OUTER JOIN command.

7. The method of claim 1, wherein each of the first data set and the second data set comprises at least one of the following: a database table, and an intermediate result of a database operation.

8. A system comprising a processor and a non-transitory computer-readable storage medium storing instructions executable by the processor to cause the system to perform operations comprising:
broadcasting a first data set to a plurality of database nodes storing a second data set, wherein each of the plurality of database nodes stores a portion of the second data set;
dividing the plurality of database nodes storing the second data set into a first subset and a second subset, wherein the first subset comprises at least one but less than all of the plurality of database nodes, the at least one database node storing a least amount of data of the second data set;
obtaining an OUTER JOIN result by executing an OUTER JOIN operation based on the first data set broadcasted to each database node of the first subset and the portion of the second data set stored in the each database node of the first subset;
obtaining an INNER JOIN result by executing an INNER JOIN operation based on the first data set broadcasted to each database node of the second subset and the portion of the second data set stored in the each database node of the second subset; and
returning a result to an OUTER JOIN command by aggregating the OUTER JOIN result from each database node of the first subset and the INNER JOIN result from each database node of the second subset.

9. The system of claim 8, wherein the operations further comprise:
identifying and removing a first row with a NULL value from the OUTER JOIN result when the INNER JOIN result comprises a second row sharing a same join key with the first row.

10. The system of claim 9, wherein the identifying and removing a first row with a NULL value comprises:
performing a GROUP BY operation to the OUTER JOIN result and the INNER JOIN result based on one or more join keys of the OUTER JOIN command.

11. The system of claim 8 wherein the identifying and removing a first row with a NULL value comprises:
performing a GROUP BY operation to the OUTER JOIN result and the INNER JOIN result based on one or more join keys of the OUTER JOIN command.

12. The system of claim 8, wherein the first data set is a distributed database data set stored in a plurality of second database nodes, and the broadcasting the first data set to a plurality of database nodes storing the second data set comprises:
broadcasting data from each database node of the plurality of second database nodes to each database node of the plurality of database nodes.

13. The system of claim 8, wherein the executing the OUTER JOIN operation based on the first data set broadcasted to the each database node of the first subset and the portion of the second data set stored in the each database node of the first subset comprises:
performing the OUTER JOIN operation by using the first data set broadcasted to the each database node of the first subset as an outer data set and the portion of the second data set stored on the each database node of the first subset as an inner data set.

14. The system of claim 8, wherein the OUTER JOIN operation executed by each of database nodes of the first subset is based on one or more join keys of the OUTER JOIN command; and
the INNER JOIN operation executed by each of database nodes of the second subset is based on the one or more join keys of the OUTER JOIN command.

15. A non-transitory computer-readable storage medium, configured with instructions executable by one or more processors to cause the one or more processors to perform operations comprising:
broadcasting a first data set to a plurality of database nodes storing a second data set, wherein each of the plurality of database nodes stores a portion of the second data set;
dividing the plurality of database nodes storing the second data set into a first subset and a second subset, wherein the first subset comprises at least one but less than all of the plurality of database nodes, the at least one database node storing a least amount of data of the second data set;
obtaining an OUTER JOIN result by executing an OUTER JOIN operation based on the first data set broadcasted to each database node of the first subset and the portion of the second data set stored in the each database node of the first subset;
obtaining an INNER JOIN result by executing an INNER JOIN operation based on the first data set broadcasted to each database node of the second subset and the portion of the second data set stored in the each database node of the second subset; and
returning a result to an OUTER JOIN command by aggregating the OUTER JOIN result from each database node of the first subset and the INNER JOIN result from each database node of the second subset.

16. The non-transitory computer-readable storage medium of claim 15, wherein the operations further comprise:

identifying and removing a first row with a NULL value from the OUTER JOIN result when the INNER JOIN result comprises a second row sharing a same join key with the first row.

17. The non-transitory computer-readable storage medium of claim 16, wherein the identifying and removing a first row with a NULL value comprises:
performing a GROUP BY operation to the OUTER JOIN result and the INNER JOIN result based on one or more join keys of the OUTER JOIN command.

18. The non-transitory computer-readable storage medium of claim 15, wherein the identifying and removing a first row with a NULL value comprises:
performing a GROUP BY operation to the OUTER JOIN result and the INNER JOIN result based on one or more join keys of the OUTER JOIN command.

19. The non-transitory computer-readable storage medium of claim 15, wherein the first data set is a distributed database data set stored in a plurality of second database nodes, and the broadcasting the first data set to a plurality of database nodes storing the second data set comprises:
broadcasting data from each database node of the plurality of second database nodes to each database node of the plurality of database nodes.

20. The non-transitory computer-readable storage medium of claim 15, wherein the executing the OUTER JOIN operation based on the first data set broadcasted to the each database node of the first subset and the portion of the second data set stored in the each database node of the first subset comprises:
performing the OUTER JOIN operation by using the first data set broadcasted to the each database node of the first subset as an outer data set and the portion of the second data set stored on the each database node of the first subset as an inner data set.

* * * * *

UNITED STATES PATENT AND TRADEMARK OFFICE
CERTIFICATE OF CORRECTION

PATENT NO. : 11,086,872 B2  
APPLICATION NO. : 17/100574  
DATED : August 10, 2021  
INVENTOR(S) : Mengmeng Chen It is certified that error appears in the above-identified patent and that said Letters Patent is hereby corrected as shown below:

In the Claims  
Claim 1, Column 10, Line 56:  
"INTER JOIN" should read -- INNER JOIN --.

Signed and Sealed this  
Seventh Day of September, 2021

Drew Hirshfeld  
*Performing the Functions and Duties of the*  
*Under Secretary of Commerce for Intellectual Property and*  
*Director of the United States Patent and Trademark Office*